United States Patent Office 3,435,925
Patented Apr. 1, 1969

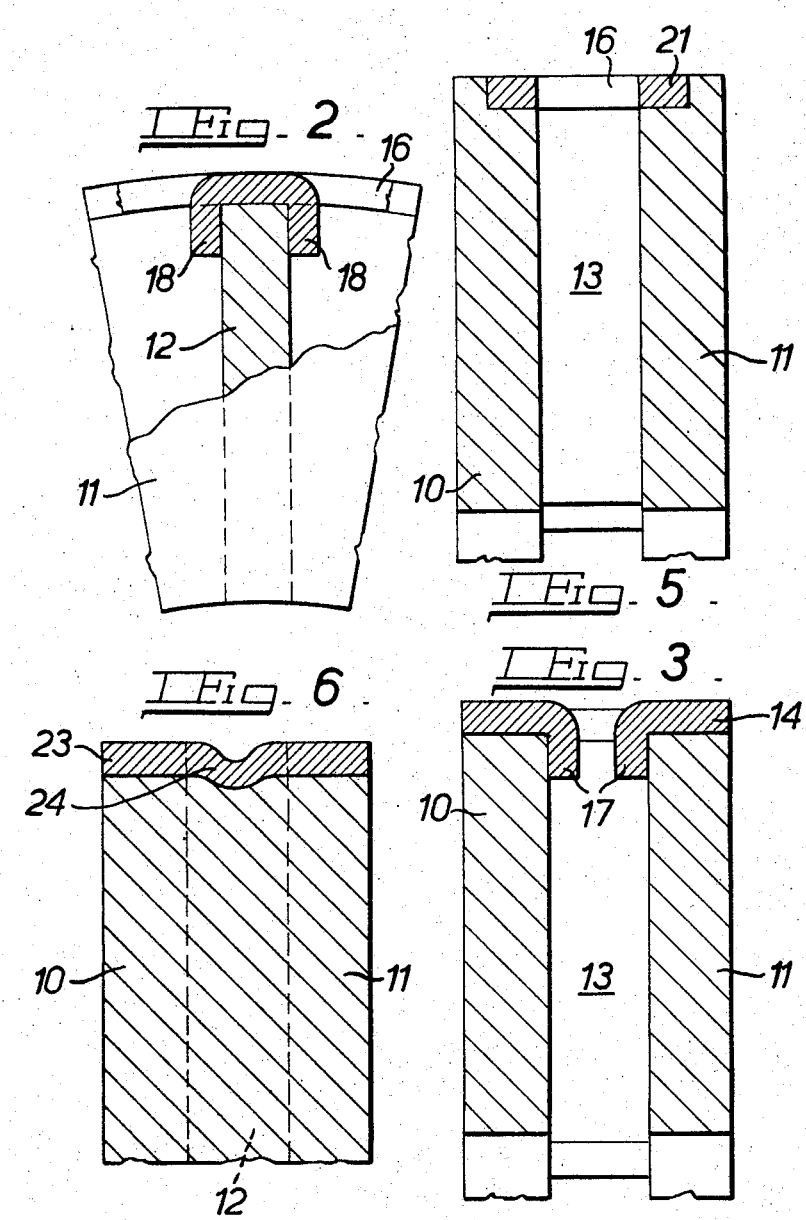

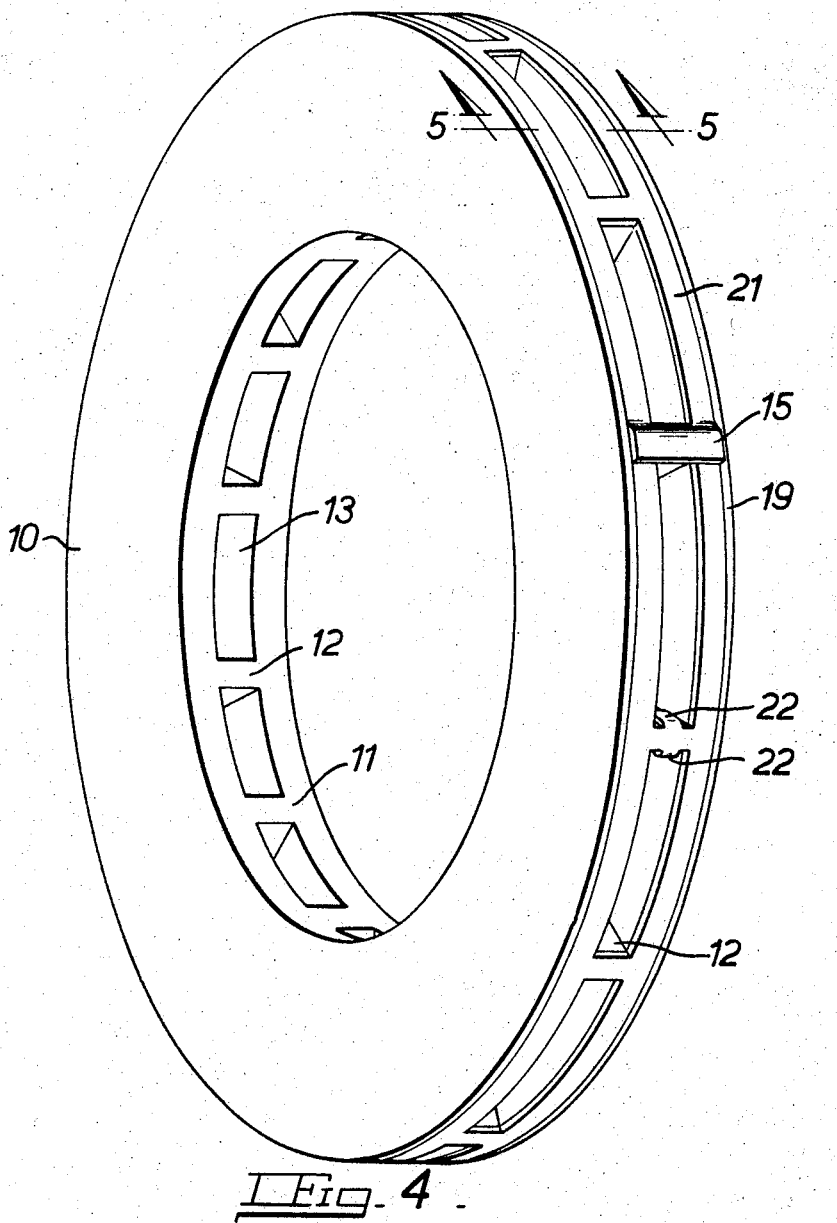

3,435,925
BRAKE DISC AND VIBRATION DAMPING MEANS THEREFOR
Anthony W. Harrison, Birmingham, England, assignor to Girling Limited, Birmingham, England, a British company
Filed June 29, 1967, Ser. No. 650,059
Claims priority, application Great Britain, June 29, 1966, 29,166/66
Int. Cl. F16d 65/10, 11/00, 13/60
U.S. Cl. 188—218
5 Claims

ABSTRACT OF THE DISCLOSURE

A ventilated disc for disc brakes having air passages extending substantially radially through it has mounted on its periphery a separate annular member which is permitted limited movement relative to the disc with the object of damping out vibrations in the disc.

---

This invention relates to improvements in discs for disc brakes of the kind in which friction members are adapted to be applied to opposite faces of a disc mounted to rotate with a wheel or other part of a vehicle transmission.

It has already been proposed to provide in the periphery of a brake disc a groove in which is received a separate member capable of movement relative to the disc and of damping vibrations in the disc, the object being to prevent squeal due to high frequency vibrations set up in the disc itself or in associated parts when the brake is applied.

According to the present invention, a ventilated brake disc, that is a disc having air passages extending through it between its inner and outer edges, has mounted on its periphery a separate annular member which is permitted limited movement relative to the disc and is adapted to damp out, wholly or partially, vibrations in the disc.

The separate member is conveniently in the form of an encircling band having preformations or slots registering with the ventilating openings in the periphery of the disc, the band being located against appreciable axial and circumferential movement on the disc. The band may, for example, be located by inturned tags engaging the ends and sides of the openings in the disc or it may be located between axially spaced annular ribs on the periphery of the disc.

Three examples of brake discs in accordance with our invention are illustrated in the accompanying drawings in which:

FIGURE 2 is a fragmentary section on the line 2—2 of FIGURE 1;

FIGURE 3 is a fragmentary section on the line 3—3 of FIGURE 1;

FIGURE 4 is a perspective view similar to FIGURE 1 showing a modified construction;

FIGURE 5 is a fragmentary section on the line 5—5 of FIGURE 4; and

FIGURE 6 is a fragmentary section showing an alternative method of locating the annular member against rotational movement of the disc.

Figure 1:
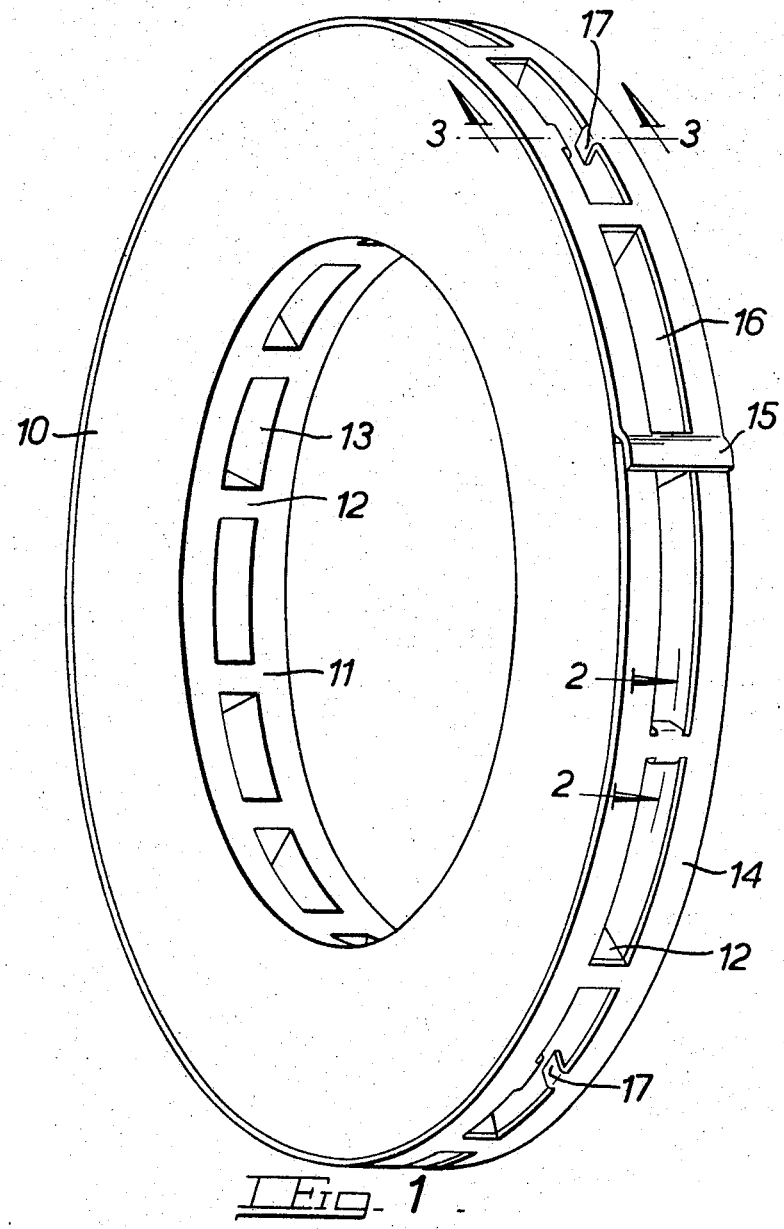
FIGURE 1 is a perspective view of an annular ventilated brake disc embodying our invention.

In the construction shown in FIGURES 1, 2 and 3 a brake comprises two flat parallel rings 10, 11 presenting braking surfaces on their outer faces and rigidly connected by integral webs 12. The webs may be radial or part-helical, and are spaced angularly to leave between them passages 13 which extend between the inner and outer edges of the disc and allow air to flow through the disc for carrying away heat generated in the disc when the brake is applied.

Fitting around the outer periphery of the disc and in frictional engagement therewith is a band 14 of metal or other strip of substantially the same width as the axial thickness of the disc. The strip is bent round the periphery of the disc and its ends are secured together by a seamed or other joint 15. The band is pierced with slots 16 registering with the outer bands of the passages 13 in the disc and is located against appreciable axial and circumferential movement relative to the disc.

Appreciable axial movement is prevented by tags 17 on the band turned down to engage opposite sides of the outer ends of passages 13 in the disc as shown in FIGURES 1 and 3, and appreciable circumferential movement is prevented by tags 18 turned down on opposite sides of webs 12 as shown in FIGURES 1 and 2.

In the modified construction shown in FIGURES 4 and 5 the disc is formed with a peripheral groove between two axially spaced radially projecting lips or ribs 19. A band 21 of a width less than the axial thickness of the disc is received in the groove, the thickness of the band being substantially equal to the radial depth of the lips or ribs 19 as shown more particularly in FIGURE 5. The band is located against appreciable circumferential movement on the disc by turning down tags 22 on the band on opposite sides of webs 12.

In the modified construction shown in FIGURE 6 an encircling band 23 is of the same width as the axial thickness of the disc and is located against appreciable axial and circumferential displacement relative to the disc by deforming central portions 24 of the band into the outer ends of webs 12.

It will be appreciated that in all these constructions the encircling band is not tightly clamped around the disc but has a limited freedom of movement which is essential to enable the band to perform its function of damping out high frequency vibrations set up in the disc when the brake is applied.

I claim:

1. A ventilated disc for disc brakes comprising two flat parallel rings connected by webs defining air passages open on the inner and outer edges of the disc wherein the improvement comprises an encircling band mounted on the periphery of the disc on said rings, the band having openings registering with the outer ends of said air passages, and means for positively locating the band against substantial axial and circumferential movement relative to the disc.

2. A ventilated disc for disc brakes comprising two flat parallel rings connected by integral webs defining air passages open on the inner and outer edges of the disc, wherein the improvement comprises an encircling band mounted on the periphery of the disc and seated on annular surfaces on said rings on axially opposed sides of the outer ends of said webs, the band having openings registering with the outer ends of said air passages, and means for positively locating the band against substantial axial and circumferential movement relative to the disc.

3. A ventilated disc for disc brakes as in claim 2 wherein said band is of a width substantially equal to the axial thickness of the disc and is located by tags on the band turned down to engage opposite sides of said air passages in the disc and opposite sides of said webs.

4. A ventilated disc for disc brakes as in claim 2 wherein said band is of a width less than the axial thickness of the disc and said disc has axially spaced radially projecting lips defining an annular groove in which said band is received.

5. A ventilated disc for disc brakes as in claim 2 wherein said band is of a width substantially equal to the axial thickness of the disc and is located by deforming central portions of said band into the outer ends of said webs.

References Cited

UNITED STATES PATENTS

| | | | |
|---|---|---|---|
| 2,505,031 | 4/1950 | Dach | 188—218 |
| 2,629,464 | 2/1953 | Helsten | 188—218 |
| 3,286,799 | 11/1966 | Shilton | 188—218 |

FOREIGN PATENTS

| | | |
|---|---|---|
| 309,041 | 4/1929 | Great Britain. |
| 708,083 | 4/1954 | Great Britain. |
| 934,096 | 8/1963 | Great Britain. |

GEORGE E. A. HALVOSA, *Primary Examiner.*

U.S. Cl. X.R.

192—107